United States Patent
Salter et al.

(10) Patent No.: US 11,836,872 B1
(45) Date of Patent: Dec. 5, 2023

(54) METHOD AND DEVICE FOR MASKED LATE-STAGE SHIFT

(71) Applicant: Apple Inc., Cupertino, CA (US)

(72) Inventors: Thomas G. Salter, Foster City, CA (US); Ganghun Kim, Sunnyvale, CA (US); Ioana Negoita, San Jose, CA (US); Devin William Chalmers, Oakland, CA (US); Anshu Kameswar Chimalamarri, San Francisco, CA (US); Thomas Justin Moore, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 137 days.

(21) Appl. No.: 17/590,033

(22) Filed: Feb. 1, 2022

Related U.S. Application Data

(60) Provisional application No. 63/144,150, filed on Feb. 1, 2021.

(51) Int. Cl.
  *G06T 19/00* (2011.01)
  *G06T 7/70* (2017.01)
(52) U.S. Cl.
  CPC .............. *G06T 19/006* (2013.01); *G06T 7/70* (2017.01)

(58) Field of Classification Search
  None
  See application file for complete search history.

(56) References Cited

U.S. PATENT DOCUMENTS

| | | | |
|---|---|---|---|
| 9,514,571 B2 * | 12/2016 | Williams | G06T 15/205 |
| 9,852,547 B2 | 12/2017 | Bostick et al. | |
| 2015/0029218 A1 | 1/2015 | Williams et al. | |
| 2018/0211447 A1 | 7/2018 | Spayd | |
| 2018/0315364 A1 * | 11/2018 | Yamamoto | G02B 27/017 |
| 2019/0042059 A1 | 2/2019 | Baer | |
| 2019/0295280 A1 | 9/2019 | Diverdi et al. | |
| 2020/0184839 A1 | 6/2020 | Dorenkamp et al. | |

* cited by examiner

*Primary Examiner* — Robert J Craddock
(74) *Attorney, Agent, or Firm* — Fernando & Partners, LLP

(57) ABSTRACT

In one implementation, a method of performing late-stage shift is performed at a device including a display, one or more processors, and non-transitory memory. The method includes generating, based on a first predicted pose of the device for a display time period, a first image. The method includes generating a mask indicating a first region of the first image and a second region of the first image. The method includes generating a second image by shifting, based on a second predicted pose of the device for the display time period, the first region of the first image without shifting the second region of the first image. The method includes displaying, on the display at the display time period, the second image.

20 Claims, 13 Drawing Sheets

METHOD AND DEVICE FOR MASKED LATE-STAGE SHIFT

CROSS-REFERENCE TO RELATED APPLICATIONS

This application claims priority to U.S. Provisional Patent App. No. 63/144,150, filed on Feb. 1, 2021, which is hereby incorporated by reference herein in its entirety.

TECHNICAL FIELD

The present disclosure generally relates to systems, methods, and devices for shifting world-locked content without shifting display-locked content.

BACKGROUND

In various implementations, an extended reality (XR) environment presented by an electronic device including a display includes world-locked content (which moves on the display when the pose of the electronic device changes) and display-locked content (which maintains its location on the display when the pose of the electronic device changes). World-locked content in an image rendered based on an estimate of the pose of the electronic device may be shifted based on an updated estimate of the pose of the electronic device, whereas display-locked content is not shifted. However, if the world-locked content and display-locked content overlap in a flat image, shifting the world-locked content has the potential to distort the display-locked content.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
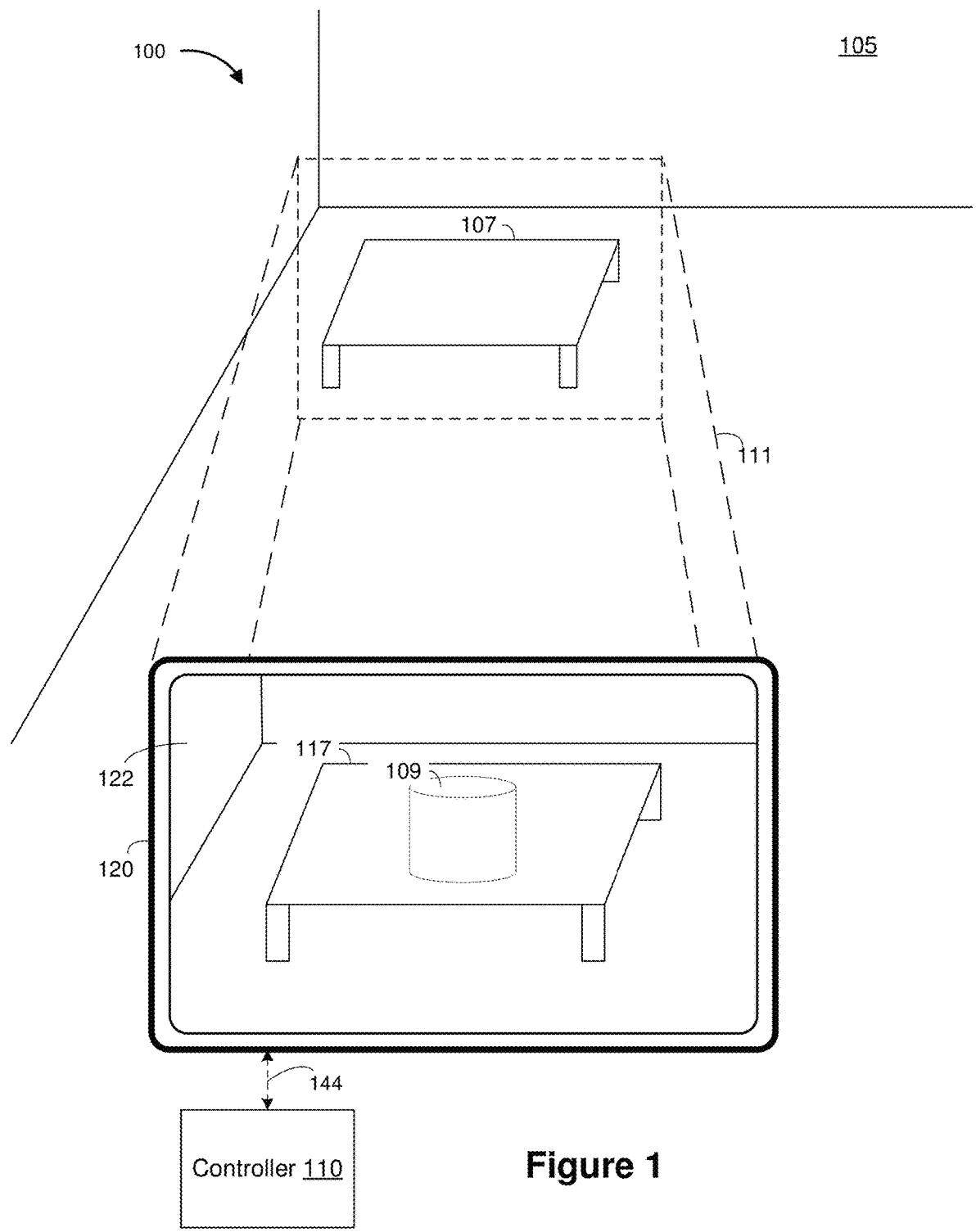
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for performing late-stage shift. In various implementations, the method is performed by a device including a display, one or more processors, and non-transitory memory. The method includes generating, based on a first predicted pose of the device for a display time period, a first image. The method includes generating a mask indicating a first region of the first image and a second region of the first image. The method includes generating a second image by shifting, based on a second predicted pose of the device for the display time period, the first region of the first image without shifting the second region of the first image. The method includes displaying, on the display at the display time period, the second image.

Various implementations disclosed herein include devices, systems, and methods for blurring content. In various implementations, the method is performed by a device including a display, one or more processors, and non-transitory memory. The method includes determining a first predicted pose of the device for a first display time period. The method includes generating, based on the first predicted pose of the device for the first display time period, a first image including a first object within a first region and a second object within a second region. The method includes determining a first predicted pose of the device for a second display time period. The method includes determining, based on the first predicted pose of the device for the second display time period, that a third region for the second object at least partially overlaps the first region in an overlap region. The method includes, in response to determining that the third region at least partially overlaps the first region, generating a second image including the first object within the first region and the second object within the third region, wherein the second object is blurred within the overlap region.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, an electronic device includes a content module and a display module. The content module generates an image based on an estimated pose of the electronic device when the image will be displayed by the display module. The content module transmits the image to the display module. In a process referred to as late-stage shift, world-locked content in the image is shifted based on an updated estimate of the pose of the electronic device when the image will be displayed by the display module and display-locked content is not shifted. However, if the world-locked content is overlapped by display-locked content, the late-stage shift of the world-locked content has the potential to distort the display-locked content and is, therefore, in various implementations, not performed. To reduce the visibility of artifacts resulting from forgoing late-stage shift, the world-locked content is blurred (e.g., by the content module) when it is overlapped by the display-locked content.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
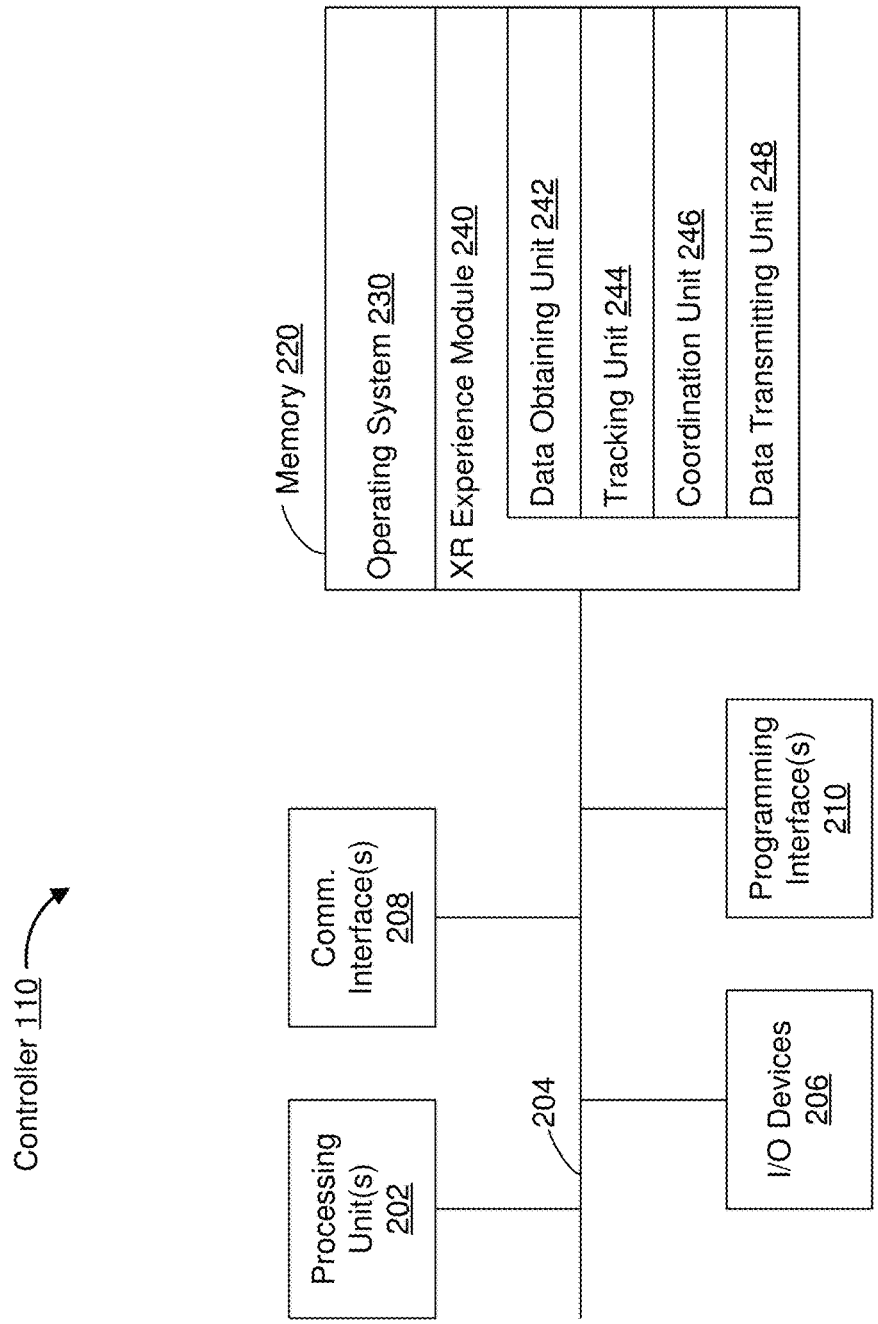
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
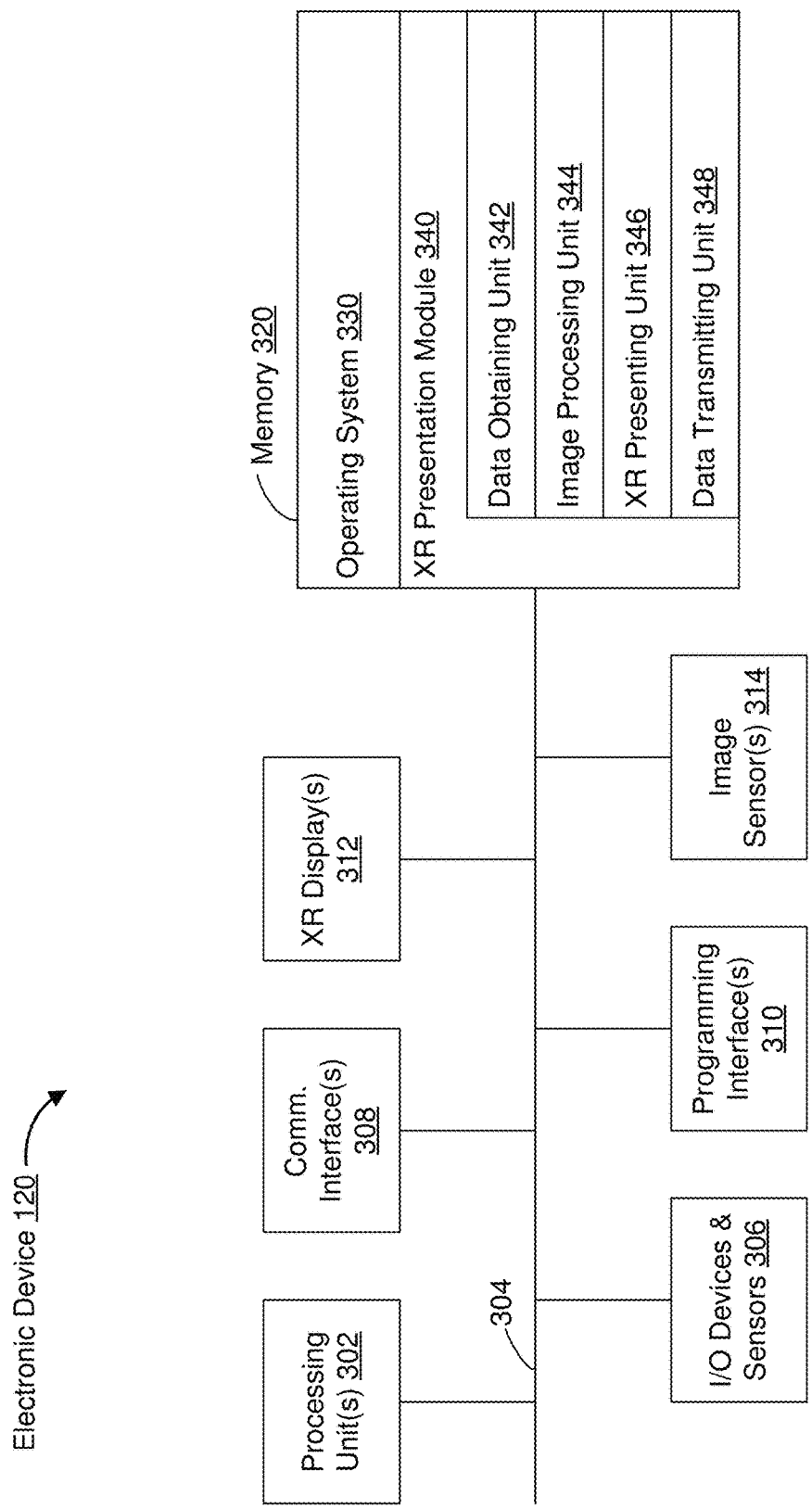
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, an image processing unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the image processing unit 344 is configured to render images based on the pose of the electronic device and provide the images (which may be transformed after rendering) to the XR presenting unit 346 (e.g., to update the one or more XR displays 312) or the data transmitting unit 348 (e.g., to update a display of another electronic device). To that end, in various implementations, the image processing unit 344 includes instructions and/or logic therefor, and heuristics and metadata therefor.

In some implementations, the XR presenting unit 346 is configured to present XR content via the one or more XR displays 312, such as a representation of the selected text input field at a location proximate to the text input device. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the image processing unit 344, the XR presenting unit 346, and the data transmitting unit 348 are shown as residing on a single device (e.g., the electronic device 120), it should be understood that in other implementations, any combination of the data obtaining unit 342, the image processing unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
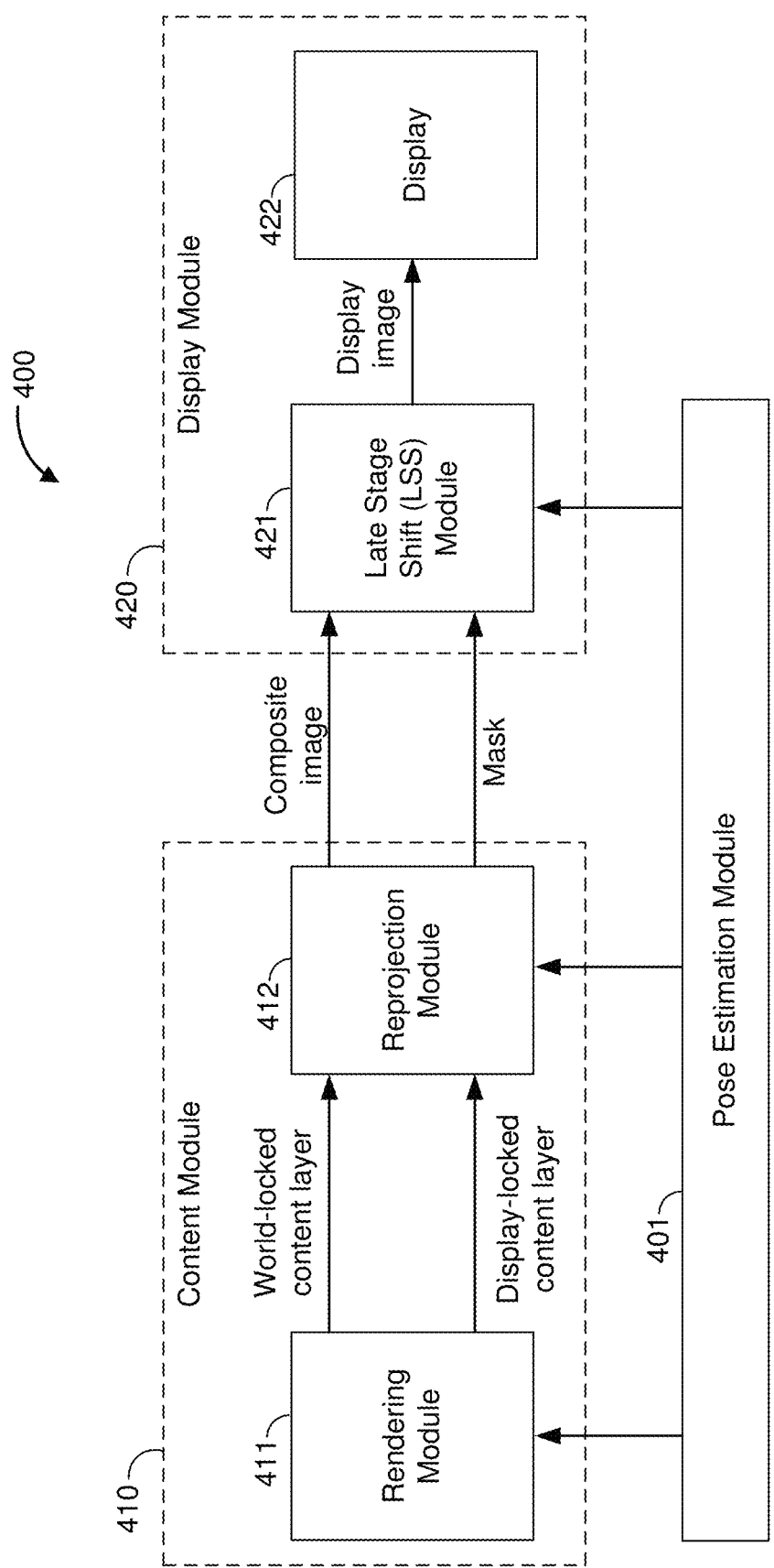
FIG. 4 illustrates an electronic device in accordance with some implementations.

FIG. 4 illustrates an electronic device 400 in accordance with some implementations. The electronic device 400 includes a pose estimation module 401 that determines a current pose of the electronic device and determines a predicted pose of the electronic device at a future time. In various implementations, the pose estimation module 401 determines the current pose of the electronic device based on camera-based pose tracking and/or IMU (inertial measurement unit) tracking. In various implementations, the pose estimation module 401 determines the predicted pose of the electronic device by extrapolating previous motion of the electronic device, e.g., current speed and/or acceleration of the electronic device.

The electronic device 400 includes a content module 410 that generates images at display frame rate based on the pose information from the pose estimation module 401 and further includes a display module 420 that displays the images at the display frame rate.

The content module 410 includes a rendering module 411 that generates rendered images at a rendering frame rate based on pose information from the pose estimation module 401. In various implementations, the rendering frame rate is approximately equal to the display frame rate. In various implementations, the rendering frame rate is less than the display frame rate. For example, in various implementations, the rendering frame rate is half the display frame rate.

In various implementations, the rendered images each include a world-locked content layer including world-locked content that is rendered based on the pose information from the pose estimation module 401 and a display-locked content layer including display-locked content that is rendered independent of the pose information from the pose estimation module 401.

As an example, the rendering module 411 generates, at a first time period prior to a first display time period of a first display image, a first rendered image based on a first predicted pose of the electronic device 400 during the first display time period from the pose estimation module 401.

The content module 410 includes a reprojection module 412 that generates composite images at the display frame rate based on updated pose information from the pose estimation module 401. In various implementations, the reprojection module 412 generates the composite images by transforming the world-locked content layers of rendered images based on pose information from the pose estimation module 401 and flattening the rendered images into a single layer. In various implementations, the reprojection module 412 transforms the world-locked content layer by applying a homographic transformation to the world-locked content layer. In various implementations, the reprojection module 412 transforms the world-locked content layer using one or more other perspective transformations.

As an example, the reprojection module 412 generates, at a second time period after the first time period and prior to the first display time period of the first display image, a first composite image based on a second predicted pose of the electronic device 400 during the first display time period from the pose estimation module 401. In various implementations, the reprojection module 412 generates the first composite image by transforming the world-locked content layer of the first rendered image based on the second predicted pose and compositing the transformed world-locked content layer and the display-locked content layer into a single layer. The pose estimation module 401 generates the second predicted pose after generating the first predicted pose. The second predicted pose, being generated closer in time to the first display time period than the first predicted pose, is more accurate than the first predicted pose.

The reprojection module 412 further generates, for each composite image, a mask indicating which portions of the composite image are to be shifted by the late-stage shift (LSS) module 421 described further below. Alternatively, in various implementations, the mask indicates which portions of the composite image are not to be shifted by the LSS module 421.

In various implementations, the mask includes a matrix of the same resolution of the composite image, each element of the matrix corresponding to a pixel of the composite image. In various implementations, each element of the matrix has a value of '1' if the corresponding pixel of the composite image is to be shifted by the LSS module 421 and, otherwise, has a value of '0'. In various implementations, each element of the matrix has a value of '1' if the corresponding pixel is not be shifted by the LSS module 421 and, otherwise, has a value of '0'.

In various implementations, the mask includes pixel coordinates indicating regions that are to be shifted by the LSS module 421, such as the corners of a rectangle surrounding a region to be shifted by the LSS module 421. In various implementations, the mask includes pixel coordinates indicating regions that are not to be shifted by the LSS module 421, such as the corners of a rectangle surrounding a region not to be shifted by the LSS module 421.

In various implementations, the mask indicates portions of the composite image corresponding to world-locked content that are to be shifted by the late-stage shift (LSS) module 421. In various implementations, the mask indicates portions of the composite image corresponding to display-locked content that are not to be shifted by the LSS module 421.

In various implementations, a region corresponding to world-locked content overlapped by display-locked content is treated as display-locked content. For example, if a pixel of the composite image corresponds to world-locked content overlapped by display-locked content, the corresponding element of the matrix of the mask has the same value of other elements of the matrix corresponding to pixels of the composite image corresponding to only display-locked content.

In various implementations, if a world-locked object is at least partially overlapped by display-locked content, the region corresponding to the entire world-locked object is treated as display-locked content. Thus, in various implementations, the mask indicates portions of the composite image corresponding to display-locked content and world-locked objects overlapped by display-locked content that are not to be shifted by the LSS module 421.

In various implementations, if a world-locked object is overlapped by display-locked content in an overlap region, only the overlap region is treated as display-locked content. Thus, in various implementations, the mask indicates portions of the composite image corresponding to display-locked content, including display-locked content that overlaps world-locked content.

The display module 420 includes the LSS module 421 that generates display images at the display frame rate based on updated pose information from the pose estimation module 401. In various implementations, the LSS module 421 performs a one-dimensional or two-dimensional pixel shift of portions of the composite images indicated by the corresponding mask based on updated pose information from the pose estimation module 401.

As an example, the LSS module 421 generates, at a third time period after the second time period and prior to the first display time period of the first display image, the first display image based on a third predicted pose of the electronic device 400 during the first display time period from the pose estimation module 401. In various implementations, the LSS module 421 generates the first display image by shifting portions of the first composite image indicated by the mask corresponding to the first composite image (e.g., world-locked content of the first composite image not overlapped by display-locked content) based on the third predicted pose. The pose estimation module 401 generates the third predicted pose after generating the second predicted pose. The third predicted pose, being generated closer in time to the first display time period than the second predicted pose, is more accurate than the second predicted pose.

The display 422 displays the display images at the display frame rate. As an example, the display 422 displays the first display image at the first display time period.

As noted above, in various implementations, the display frame rate is greater than the rendering frame rate. To achieve this, in various implementations, the reprojection module 412 performs frame rate extrapolation.

As an example, the reprojection module 412 generates, at a first time period prior to a second display time period of a second display image, a second composite image based on the first rendered image and a first predicted pose of the electronic device 400 during the second display time period from the pose estimation module 401. In various implementations, the reprojection module 412 generates the second composite image by transforming the world-locked content layer of the first rendered image based on the first predicted pose and compositing the transformed world-locked content layer and the display-locked content layer into a single layer. The LSS module 421 generates, at a second time period after the first time period and prior to the second display time period of the second display image, the second display image based on a second predicted pose of the electronic device 400 during the second display time period from the pose estimation module 401. In various implementations, the LSS module 421 generates the second display image by shifting portions of the second composite indicated by the mask corresponding to the second composite image (e.g., world-locked content of the second composite image not overlapped by display-locked content) based on the second predicted pose. The display 422 displays the second display image at the second display time period.

FIGS. 5A-5G illustrate an XR environment 500 from the perspective of a user of an electronic device displayed, at least in part, by a display of the electronic device. In various implementations, the perspective of the user is from a location of an image sensor of the electronic device. For example, in various implementations, the electronic device is a handheld electronic device and the perspective of the user is from a location of the image sensor of the handheld electronic device directed towards the physical environment. In various implementations, the perspective of the user is from the location of a user of the electronic device. For example, in various implementations, the electronic device is a head-mounted electronic device and the perspective of the user is from a location of the user directed towards the physical environment, generally approximating the field-of-view of the user were the head-mounted electronic device not present. In various implementations, the perspective of the user is from the location of an avatar of the user. For example, in various implementations, the XR environment 500 is a virtual environment and the perspective of the user is from the location of an avatar or other representation of the user directed towards the virtual environment.

In a particular implementation, the electronic device is a head-mounted device with a transparent display. Thus, the XR environment includes a real environment (which the user views through the transparent display) with virtual objects (displayed by the transparent display) superimposed over the real environment. Further, being head-mounted, the pose of the electronic device (e.g., its position and/or orientation) is changed as the user changes the pose of the user's head.

FIGS. 5A-5G illustrate an XR environment 500 during a series of time periods. In various implementations, each time period is an instant, a fraction of a second, a few a few seconds, a few hours, a few days, or any length of time.

The XR environment 500 includes a plurality of objects, including one or more real objects (e.g., a table 501 and a television 502) and one or more virtual objects (e.g., a virtual cylinder 511 and a virtual clock 512). In various implementations, certain objects (such as the real objects 501 and 502 and the virtual cylinder 511) are displayed at a location in the XR environment 500, e.g., at a location defined by three coordinates in a three-dimensional (3D) XR coordinate system. Accordingly, when the electronic device moves in the XR environment 500 (e.g., changes either position and/or orientation), the objects are moved on the display of the electronic device, but retain their (possibly time-dependent) location in the XR environment 500. Such virtual objects that, in response to motion of the electronic device, move on the display, but retain their position in the XR environment are referred to as world-locked objects. In various implementations, certain virtual objects (such as the virtual clock 512) are displayed at locations on the display such that when the electronic device moves in the XR environment 500, the objects are stationary on the display on the electronic device. Such virtual objects that, in response to motion of the electronic device, retain their location on the display are referred to as head-locked objects or display-locked objects.

Figure 5A:
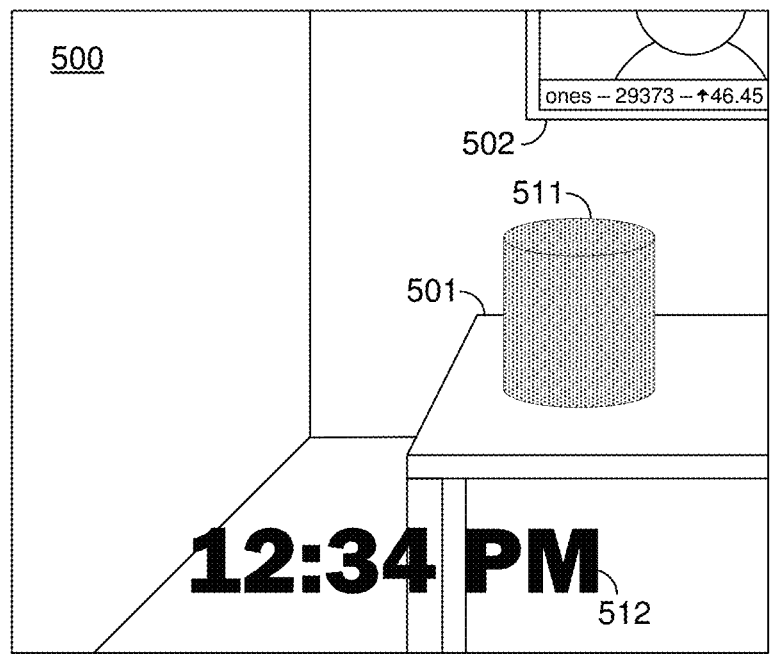
FIGS. 5A-5G illustrate an XR environment during various time periods in accordance with some implementations.

FIG. 5A illustrates the XR environment 500 during a first display time period. During the first display time period, the electronic device displays the virtual cylinder 511 at a first location on the display corresponding, for a first pose of the electronic device, to a location in the XR environment 500, e.g., a location on the table 501. During the first display time period, the electronic device displays the virtual clock 512 at a fixed location on the display.

To display the virtual cylinder 511 at the first location on the display 422 of the electronic device 400 of FIG. 4, the rendering module 411 generates, at a first time period prior to the first display time period, a first rendered image based on a first predicted pose of the electronic device 400 for the first display time period from the pose estimation module 401. The first rendered image includes a world-locked content layer including the virtual cylinder 511 and a display-locked content layer including the virtual clock 512. The reprojection module 412 generates, at a second time period after the first time period and prior to the first display time period, a first composite image by transforming the world-locked content layer of the first rendered image based on a second predicted pose of the electronic device 400 for the first display time period from the pose estimation module 401 and compositing it with the display-locked content layer from the first rendered image. The reprojection module 412 further generates a first mask indicating a region of the first composite image corresponding to the display-locked content, e.g., the virtual clock 512. The LSS module 421 generates, at a third time period after the second time period and prior to the first display time period, a first display image by shifting the portion of the first composite image not indicated by the first mask as corresponding to display-locked content based on a third predicted pose of the electronic device 400 for the first display time period from the pose estimation module 401. The display 422 displays the first display image at the first display time period.

Figure 5B:
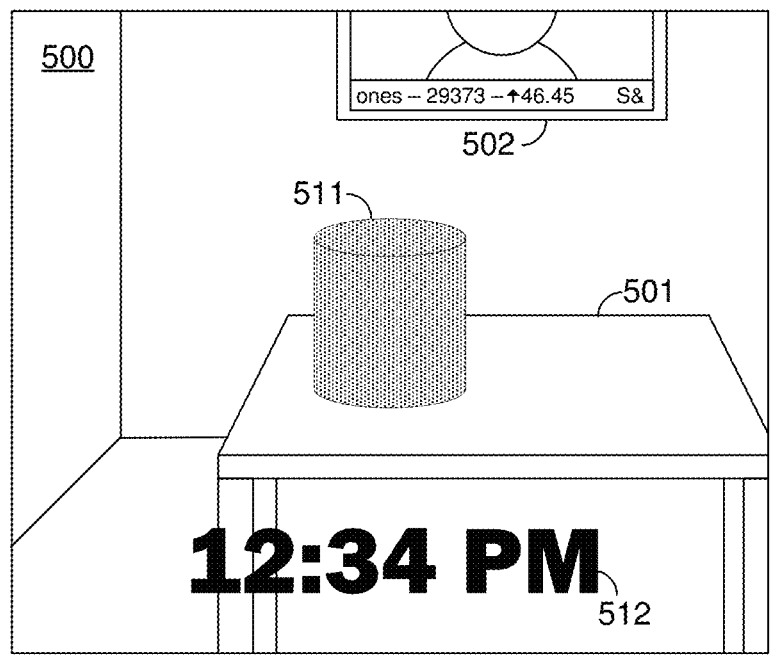

FIG. 5B illustrates the XR environment 500 during a second display time period subsequent to the first display time period. During the second display time period, as compared to the first display time period, the pose of the electronic device has changed from the first pose to a second pose. In particular, the electronic device has moved to the right. During the second display time period, the electronic device displays the virtual cylinder 511 at a second location on the display corresponding, for the second pose of the electronic device, to the location in the XR environment 500. During the second display time period, the electronic device displays the virtual clock 512 at the fixed location on the display.

To display the virtual cylinder 511 at the second location on the display 422 of the electronic device 400 of FIG. 4, the reprojection module 412 generates, at a first time period prior to the second display time period, a second composite image by transforming the world-locked content layer of the first rendered image based on a first predicted pose of the electronic device 400 for the second display time period from the pose estimation module 401 and compositing it with the display-locked content layer of the first rendered image. The reprojection module 412 further generates a second mask indicating a region of the second composite image corresponding to the display-locked content, e.g., the virtual clock 512. The LSS module 421 generates, at a second time period subsequent to the first time period and prior to the second display time period, a second display image by shifting the portion of the second composite image not indicated by the second mask as corresponding to display-locked content based on a second predicted pose of the electronic device 400 for the second display time period from the pose estimation module 401. The display 422 displays the second display image at the second display time period.

Figure 5C:
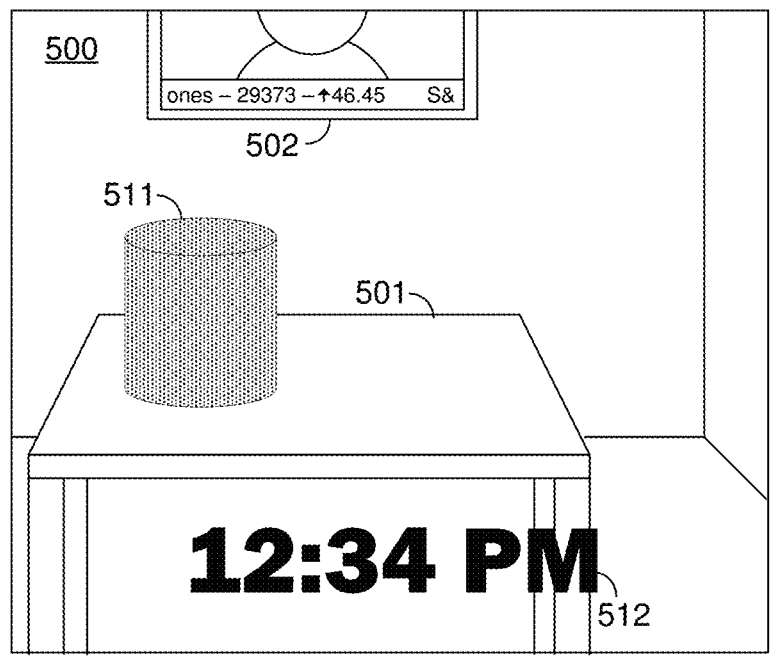

FIG. 5C illustrates the XR environment 500 during a third display time period subsequent to the second display time period. During the third display time period, as compared to the second display time period, the pose of the electronic device has changed from the second pose to a third pose. In particular, the electronic device has moved further to the right. During the third display time period, the electronic device displays the virtual cylinder 511 at a third location on the display corresponding, for the third pose of the electronic device, to the location in the XR environment 500. During the third display time period, the electronic device displays the virtual clock 512 at the fixed location on the display.

To display the virtual cylinder 511 at the third location on the display 422 of the electronic device 400 of FIG. 4, the rendering module 411 generates, at a first time period prior to the third display time period, a second rendered image based on a first predicted pose of the electronic device 400 for the third display time period from the pose estimation module 401. The second rendered image includes a world-locked content layer including the virtual cylinder 511 and a display-locked content layer including the virtual clock 512. The reprojection module 412 generates, at a second time period after the first time period and prior to the third display time period, a third composite image by transforming the world-locked content layer of the second rendered image based on a second predicted pose of the electronic device 400 for the third display time period from the pose estimation module 401 and compositing it with the display-locked content layer from the second rendered image. The reprojection module 412 further generates a third mask indicating a region of the third composite image corresponding to the display-locked content, e.g., the virtual clock 512. The LSS module 421 generates, at a third time period after the second time period and prior to the third display time period, a third display image by shifting the portion of the third composite image not indicated by the third mask as corresponding to display-locked content based on a third predicted pose of the electronic device 400 for the third display time period from the pose estimation module 401. The display 422 displays the third display image at the third display time period.

Figure 5D:
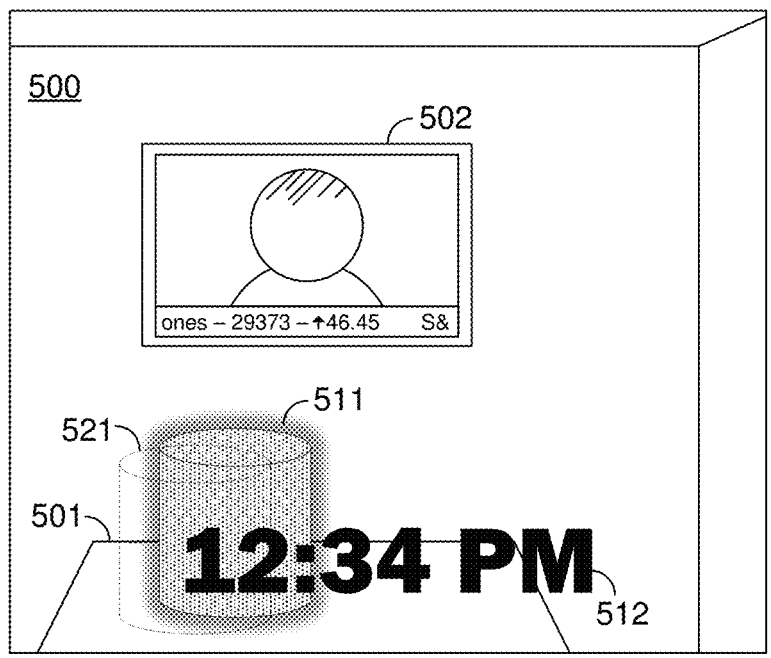

FIG. 5D illustrates the XR environment 500 during a fourth display time period subsequent to the third display time period. During the fourth display time period, as compared to the third display time period, the pose of the electronic device has changed from the third pose to a fourth pose. In particular, the electronic device has moved up. During the fourth display time period, a fourth location 521 on the display corresponds, for the fourth pose of the electronic device, to the location in the XR environment 400. However, during the fourth display time period, the electronic device displays the virtual cylinder 511 at an offset fourth location on the display. Further, the virtual cylinder 511 is blurred. During the fourth display time period, the electronic device displays the virtual clock 512 at the fixed location on the display.

To display the virtual cylinder 511 at the offset fourth location on the display 422 of the electronic device 400 of FIG. 4, the rendering module 411 generates, at a first time period prior to the fourth display time period, a third rendered image based on a first predicted pose of the electronic device 400 for the fourth display time period from the pose estimation module 401. The third rendered image includes a world-locked content layer including the virtual cylinder 511 and a display-locked content layer including the virtual clock 512. The reprojection module 412 generates, at a second time period after the first time period and prior to the fourth display time period, a fourth composite image by transforming the world-locked content layer of the third rendered image based on a second predicted pose of the electronic device 400 for the fourth display time period from the pose estimation module 401 and compositing it with the display-locked content layer from the third rendered image. The reprojection module 412 further generates a fourth mask indicating a region of the fourth composite image corresponding to the display-locked content, e.g., the virtual clock 512, and the world-locked objects overlapped by display-locked content, e.g., the virtual cylinder 511. The LSS module 421 generates, at a third time period after the second time period and prior to the fourth display time period, a fourth display image by shifting the portion of the fourth composite image not indicated as corresponding to display-locked content by the fourth mask based on a third predicted pose of the electronic device 400 for the fourth display time period from the pose estimation module 401. The display 422 displays the fourth display image at the fourth display time period. Because the virtual cylinder 511 is indicated by the mask as corresponding to display-locked content, the LSS module 421 does not shift the virtual cylinder 511 from the offset fourth location (based on the second predicted pose) to the fourth location 521 (based on the third predicted pose). Because the second predicted pose is not as accurate as the third predicted pose received at a later time, the offset fourth location is near, but not exactly, the fourth location 521.

Performing late-stage shift of the virtual cylinder 511 to generate the fourth display image would deform the virtual clock 512. Thus, in various implementations and as illustrated in FIG. 5D, the late-stage shift of the virtual cylinder 511 is not performed. In various implementations, to compensate for the lack of late-stage shift and reduce the appearance of artifacts caused by the lack of late-stage shift, world-locked content that is overlapped by display-locked content is blurred in the rendered images generated by the rendering module 411 or in the composite images generated by the reprojection module 412.

Figure 5E:
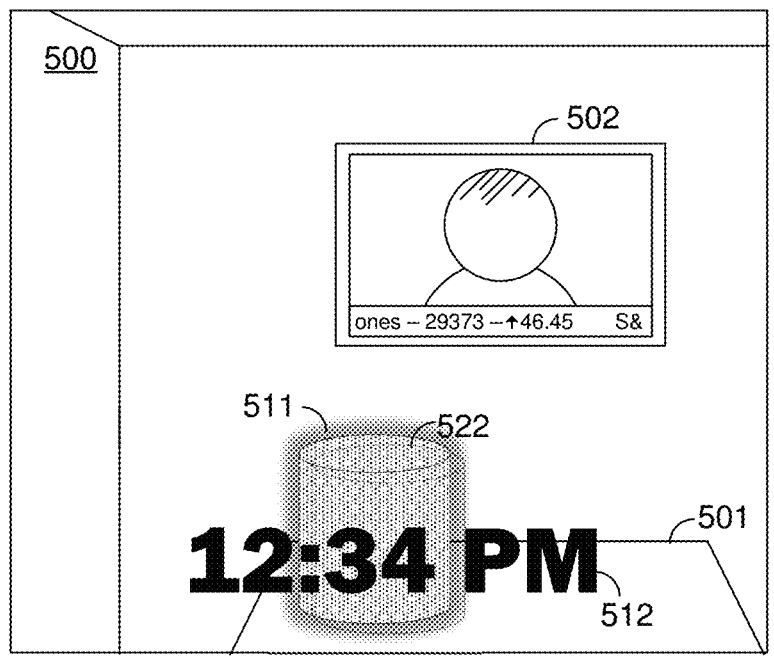

FIG. 5E illustrates the XR environment 500 during a fifth display time period subsequent to the fourth display time period. During the fifth display time period, as compared to the fourth display time period, the pose of the electronic device has changed from the fourth pose to a fifth pose. In particular, the electronic device has moved left. During the fifth display time period, a fifth location 522 on the display corresponds, for the fifth pose of the electronic device, to the location in the XR environment 500. However, during the fifth display time period, the electronic device displays the virtual cylinder 511, blurred, at an offset fifth location on the display. During the fifth display time period, the electronic device displays the virtual clock 512 at the fixed location on the display.

To display the virtual cylinder 511 at the offset fifth location on the display 422 of the electronic device 400 of FIG. 4, the reprojection module 412 generates, at a first time period prior to the fifth display time period, a fifth composite image by transforming the world-locked content layer of the third rendered image based on a first predicted pose of the electronic device 400 for the fifth display time period from the pose estimation module 401 and compositing it with the display-locked content layer from the third rendered image. The reprojection module 412 further generates a fifth mask indicating a region of the fifth composite image corresponding to the display-locked content, e.g., the virtual clock 512, and the world-locked objects overlapped by display-locked content, e.g., the virtual cylinder 511. The LSS module 421 generates, at a third time period after the second time period and prior to the fifth display time period, a fifth display image by shifting the portion of the fifth composite image not indicated by the fifth mask as corresponding to display-locked content based on a third predicted pose of the electronic device 400 for the fifth display time period from the pose estimation module 401. The display 422 displays the fifth display image at the fifth display time period. Because the virtual cylinder 511 is indicated by the mask as corresponding to display-locked content, the LSS module 421 does not shift the virtual cylinder 511 from the offset fifth location (based on the second predicted pose) to the fifth location 522 (based on the third predicted pose). Because the second predicted pose is not as accurate as the third predicted pose received at a later time, the offset fifth location is near, but not exactly, the fifth location 522.

Figure 5F:
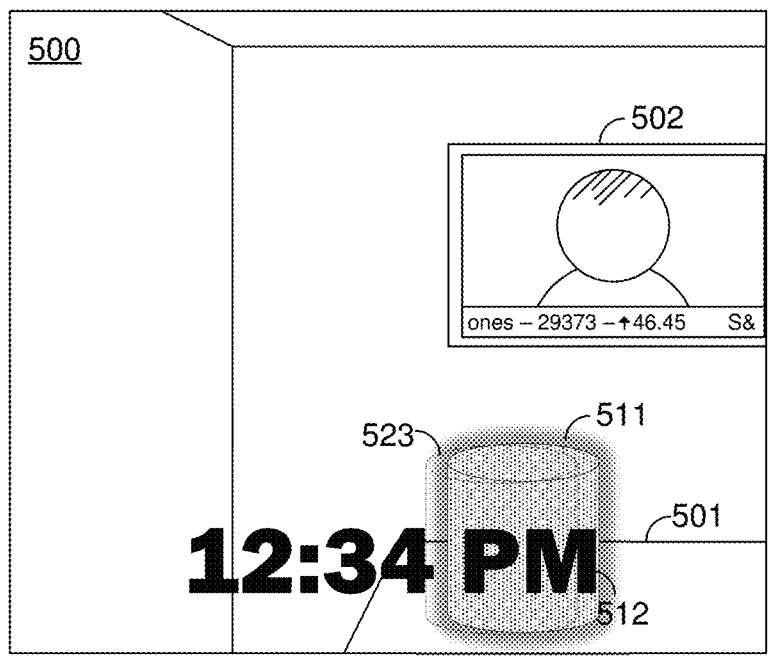

FIG. 5F illustrates the XR environment 500 during a sixth display time period subsequent to the fifth display time period. During the sixth display time period, as compared to the fifth display time period, the pose of the electronic device has changed from the fifth pose to a sixth pose. In particular, the electronic device has moved further to the left. During the sixth display time period, a sixth location 523 on the display corresponds, for the sixth pose of the electronic device, to the location in the XR environment 500. However, during the sixth display time period, the electronic device displays the virtual cylinder 511 at an offset sixth location on the display. Further, the virtual cylinder 511 is blurred. During the sixth display time period, the electronic device displays the virtual clock 512 at the fixed location on the display.

To display the virtual cylinder 511 at the offset sixth location on the display 422 of the electronic device 400 of FIG. 4, the rendering module 411 generates, at a first time period prior to the sixth display time period, a fourth rendered image based on a first predicted pose of the electronic device 400 for the sixth display time period from the pose estimation module 401. The fourth rendered image includes a world-locked content layer including the virtual cylinder 511 and a display-locked content layer including the virtual clock 512. The reprojection module 412 generates, at a second time period after the first time period and prior to the sixth display time period, a sixth composite image by transforming the world-locked content layer of the fourth rendered image based on a second predicted pose of the electronic device 400 for the sixth display time period from the pose estimation module 401 and compositing it with the display-locked content layer from the fourth rendered image. The reprojection module 412 further generates a sixth mask indicating a region of the sixth composite image corresponding to the display-locked content, e.g., the virtual clock 512, and the world-locked objects overlapped by display-locked content, e.g., the virtual cylinder 511. The LSS module 421 generates, at a third time period after the second time period and prior to the sixth display time period, a sixth display image by shifting the portion of the sixth composite image not indicated by the sixth mask as corresponding to display-locked content based on a third predicted pose of the electronic device 400 for the sixth display time period from the pose estimation module 401. The display 422 displays the sixth display image at the sixth display time period. Because the virtual cylinder 511 is indicated by the mask as corresponding to display-locked content, the LSS module 421 does not shift the virtual cylinder 511 from the offset sixth location (based on the second predicted pose) to the sixth location 523 (based on the third predicted pose). Because the second predicted pose is not as accurate as the third predicted pose received at a later time, the offset sixth location is near, but not exactly, the sixth location 523.

In various implementations, the reprojection module 412 generates a first composite image based on a predicted pose at a first display time, a second composite image based on a predicted pose at a second display time, and a third composite image based on a predicted pose at a third display time. Because the predicted pose at the first display time, the predicted pose at the second display time, and the predicted pose at the third display time may be inaccurate by different amounts, in various implementations, a lack of late-stage shift (e.g., because the world-locked content is overlapped by display-locked content) makes virtual world-locked content appear jittery, e.g., with sputtered random movements similar to Brownian motion.

In various implementations, the display 422 includes a field-sequential color display, in which different channels (e.g., bit-planes, color fields, or color channels) of an image are displayed at different times. For example, in various implementations, the reprojection module 412 generates a composite image based on a predicted pose at a general display time including a red channel, a blue channel, and a green channel. In various implementations, the LSS module 421 shifts the world-locked content of the red channel based on a predicted pose at a red channel display time, shifts the world-locked content of the blue channel based on a predicted pose at a blue channel display time, and shifts the world-locked content of the green channel based on a predicted pose at a green channel display time. The predicted pose at the red channel display time, the predicted pose at the blue channel display time, and the predicted pose at the green channel display time are more accurate than the predicted pose at the general display time as the predictions are performed closer in time to the actual channel display times and incorporate the difference in channel display times. A lack of late-stage shift (e.g., because the world-locked content is overlapped by display-locked content) makes virtual world-locked content appear spectrally smeared, with a rainbow halo, and/or subject to chromatic aberration.

In various implementations, the reprojection module 412 incorporates the different channel display times in generating the composite image. For example, in various implementations, the reprojection module 412 generates an image including a red channel based on a predicted pose at a red channel display time, a blue channel based on a predicted pose at a blue channel display time, and a green channel based on a predicted pose at a green channel display time. In various implementations, the LSS module 421 shifts the world-locked content of the red channel based on an updated predicted pose at the red channel display time, shifts the world-locked content of the blue channel based on an updated predicted pose at the blue channel display time, and shifts the world-locked content of the green channel based on an updated predicted pose at the green channel display time. Because the predicted pose at the red channel display time, the predicted pose at the blue channel display time, and the predicted pose at the green display time may be inaccurate by different amounts, in various implementations, a lack of late-stage shift (e.g., because the world-locked content is overlapped by display-locked content) makes virtual world-locked objects appear spectrally smeared, with a rainbow halo, and/or subject to chromatic aberration.

As noted above, in various implementations, to compensate for the lack of late-stage shift and reduce the appearance of artifacts caused by the lack of late-stage shift, world-locked content that is overlapped by display-locked content is blurred in the composite images generated by the reprojection module 412. In various implementations, the rendering module 411 blurs the world-locked content. In various implementations, the reprojection module 412 blurs the world-locked content.

In various implementations, a blur radius of the blurring is proportional to the expected error in the pose prediction. In various implementations, the blur radius of the blurring is proportional to the expected amount of pixel shift not being performed by the LSS module 421.

Figure 5G:
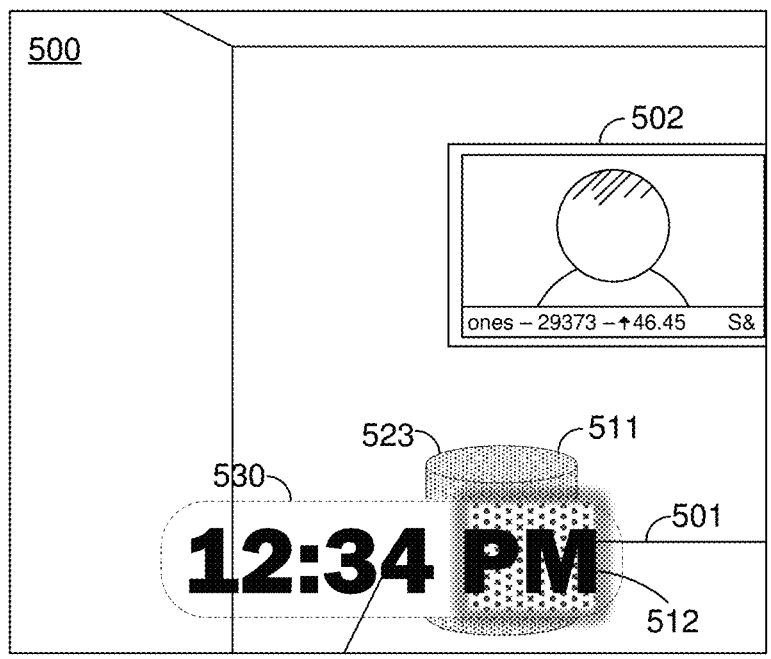

In various implementations, if any portion of a virtual world-locked object is to be rendered within a region surrounding or underlying a virtual display-locked object, the entire world-locked object is blurred. In various implementations, only the portion of the virtual world-locked object within the region surrounding or underlying the virtual display-locked object is blurred. For example, in FIG. 5F, the virtual cylinder 511 is behind the virtual clock 512 and the entire virtual cylinder 511 is blurred. FIG. 5G illustrates an alternative implementation of the XR environment 500 during the sixth display time period in which only the portion of the virtual cylinder 511 behind a region 530 surrounding the virtual clock 512 is blurred. The rest of the virtual cylinder 511 is not blurred and is transformed by the LSS module 421 from the offset sixth location to the sixth location 523. In various implementations, the region 530 is indicated by the sixth mask.

Figure 6:
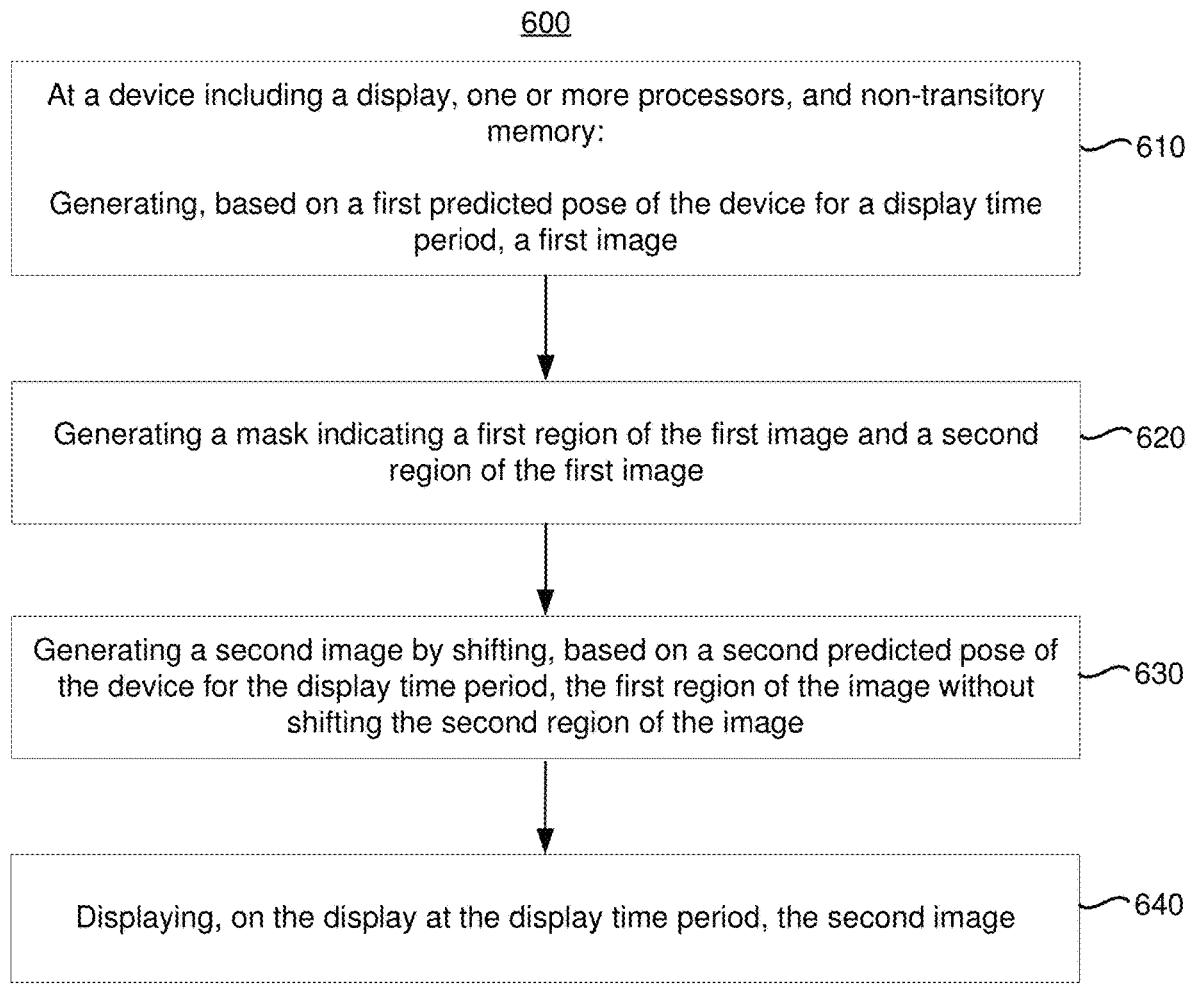
FIG. 6 is a flowchart representation of a method of performing late-stage shift in accordance with some implementations.

FIG. 6 is a flowchart representation of a method 600 of late-stage shifting an image in accordance with some implementations. In various implementations, the method 600 is performed by a device including a display, one or more processors, and non-transitory memory (e.g., the electronic device 120 of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device generating, based on a first predicted pose of the device for a display time, a first image. In various implementations, the first image is a composite image generated by a reprojection module. For example, in various implementations, generating the first image includes generating a first rendered image based on a third predicted pose of the device for the display time period (determined before the first predicted pose of the device for the display time period is determined). The first rendered image includes a first layer and a second layer. For example, the first layer includes world-locked content and the second layer includes display-locked content. In various implementations, generating the first image further includes generating the first image by transforming, based on the first predicted pose of the device for the display time period, the first layer and compositing the transformed first layer and the second layer.

In various implementations, generating the first image further includes blurring at least a portion of the first layer. For example, in various implementations, the device blurs world-locked content that is overlapped by display-locked content.

The method 600 continues, in block 620, with the device generating a mask indicating a first region of the first image and a second region of the first image. In various implementations, the second region includes display-locked content. In various implementations, the second region includes world-locked content that is overlapped by display-locked content. In various implementations, the first region includes world-locked content not overlapped by display-locked content.

In various implementations, the mask includes a matrix of elements corresponding to pixels of the first image. The mask indicates the first region with elements having a first value (e.g., '0') and indicates the second region with elements having a second value different than the first value (e.g., '1'). In various implementations, the mask indicates the second region via a set of coordinates, e.g., the corners of a bounding box surrounding display-locked content.

The method 600 continues, in block 630, with the device generating a second image by shifting, based on a second predicted pose of the device for the display time period, the first region of the first image without shifting the second region of the first image. In various implementations, the second image is a display image generated by an LSS module. In various implementations, the method 600 includes determining the first predicted pose of the device for the display time period and, after determining the first predicted pose of the device for the display time period, determining the second predicted pose of the device for the display time period. Accordingly, the second predicted pose is determined closer in time to the display time period and is likely more accurate than the first predicted pose. In various implementations, the first predicted pose of the device for the display time period and/or the second predicted pose of the device for the display time period determined using camera-based tracking and/or IMU tracking.

The method 600 continues, in block 640, with the device displaying, on the display at the display time period, the second image.

In various implementations, the device performs frame rate extrapolation. For example, in various implementations, the method 600 further includes generating a third image by transforming, based on a first predicted pose of the device for a second display time period, the first layer (of the first rendered image) and compositing the transformed layer and the second layer. The method 600 further includes generating a second mask indicating a first region of the third image and a second region of the third image. The method 600 further includes generating a fourth image by shifting, based on a second predicted pose of the device for the second display time period, the first region of the third image without shifting the second region of the third image. The method 600 further includes displaying, on the display at the second display time period, the fourth image.

Figure 7:
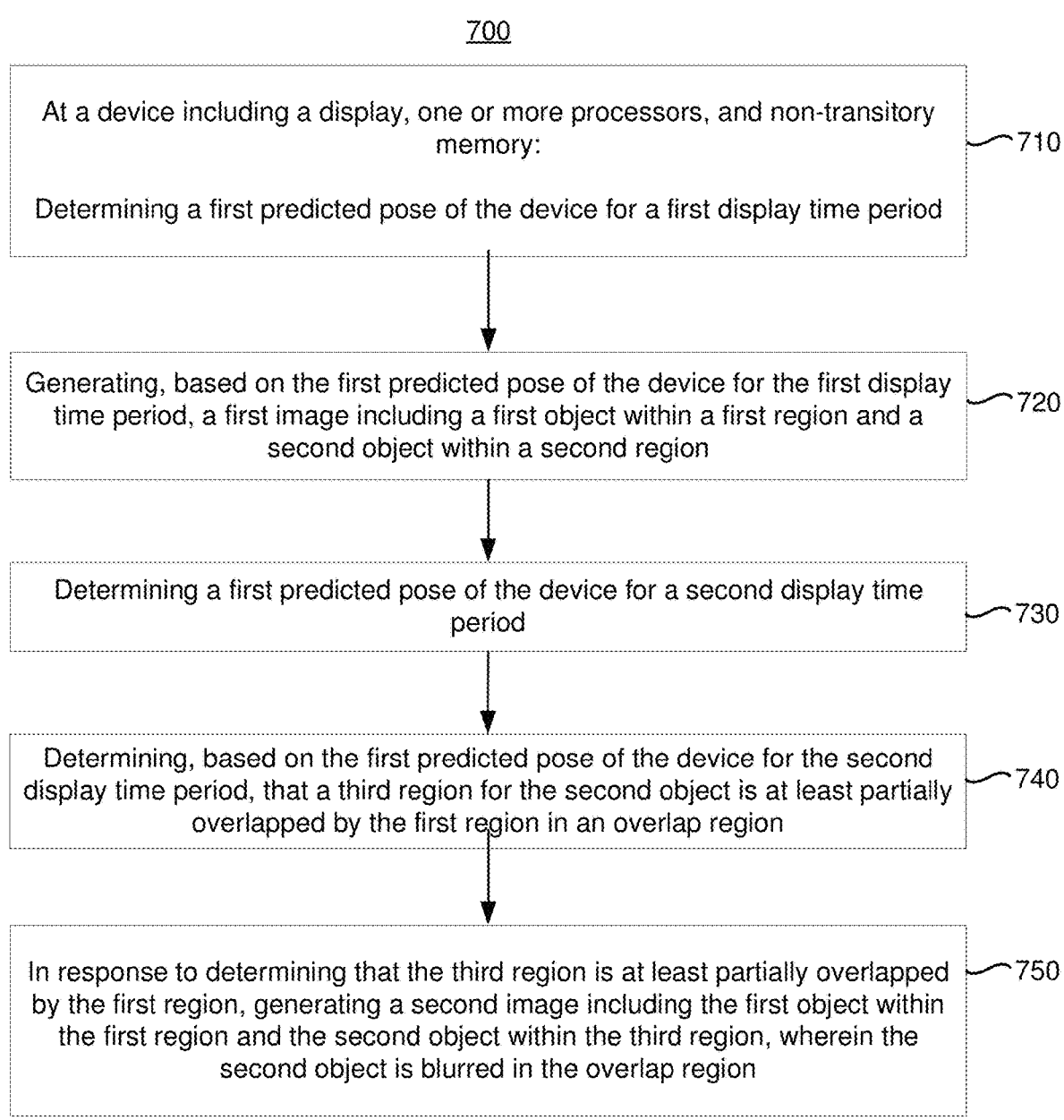
FIG. 7 is a flowchart representation of a method of blurring content in accordance with some implementations.

FIG. 7 is a flowchart representation of a method 700 of blurring content in accordance with some implementations. In various implementations, the method 700 is performed by a device including a display, one or more processors, and non-transitory memory (e.g., the electronic device 120 of FIG. 3). In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, in block 710, with the device determining a first predicted pose of the device for a first display time period. In various implementations, the first pose of the device is determined using camera-based tracking and/or IMU tracking.

The method 700 continues, in block 720, with the device generating, based on the first predicted pose of the device for the first display time period, a first image including a first object within a first region and a second object within a second region. For example, in FIG. 5A, the XR environment 500 includes the virtual clock 512 within a first region and the virtual cylinder 511 within a second region based on a first pose of the electronic device. In various implementations, the first object is a display-locked object and the second object is a world-locked object. In various implementations, the first object and the second object are included in the same layer. In various implementations, the first image is a single-layer image or a composite image. In various implementations, the first image is generated by a content module. In various implementations, the first image is generated by a reprojection module.

In various implementations, generating the first image includes generating a first rendered image based on third predicted pose of the device for the first display time period (determined before the first predicted pose of the device for the first display time period is determined), the first rendered image including a first layer including the first object and a second layer including the second object. In various implementations, generating the first image includes generating the first image by transforming, based on the first predicted pose of the device for the first display time period, the second layer and compositing the transformed second layer and the first layer. In various implementations, the second layer includes world-locked content and the first layer includes display-locked content.

The method 700 continues, in block 730, with the device determining a first predicted pose of the device for a second display time period.

The method 700 continues, in block 740, with the device determining, based on the first predicted pose of the device for the second display time period, that a third region of the second object is at least partially overlapped by the first region in an overlap region.

The method 700 continues, in block 750, with the device, in response to determining that the third region is at least partially overlapped by the first region, generating a second image including the first object within the first region and the second object within the third region, wherein the second object is blurred within the overlap region. For example, in FIG. 5D, the XR environment 500 includes the virtual clock 512 within the first region and the virtual cylinder 511 within a third region that at least partially overlaps the first region in an overlap region. In response, the virtual cylinder 511 is blurred in the overlap region (and, in FIG. 5D, the remainder of the third region).

In various implementations, the second image is a single-layer image or a composite image. In various implementations, the second image is generated by a content module. In various implementations, the second image is generated by a reprojection module.

In various implementations, the second object is blurred within the third region. For example, in FIG. 5D, the entire virtual cylinder 511 is blurred. In contrast, in FIG. 5G, only the portion of the virtual cylinder 511 in the overlap region is blurred.

In various implementations, the second object is blurred within the overlap region with a blurring radius proportional to a confidence of an accuracy of the second pose. Thus, in various implementations, the blurring radius is proportional to a speed or acceleration of the device which effects the accuracy of the pose estimation.

In various implementations, the method 700 further includes, after generating the first image, determining a second predicted pose of the device for the first display time period. The method 700 further includes generating a first display image by shifting, based on the second predicted pose of the device for the first display time period, the second region of the first rendered image. Thus, in various implementations, the method 700 includes performing late-stage shift on the first image. The method 700 further includes displaying, on the display at the first display time, the first display image.

In various implementations, the method 700 further includes, in response to determining that the third region at least partially overlaps the first region in an overlap region, forgoing shifting, based on a second predicted pose of the device for the second display time period, the overlap region of the second image. Thus, in various implementations, the method 700 includes skipping late-stage shift (at least of the overlap region) when world-locked content is overlapped by display-locked content. In various implementations, the second object is blurred within the overlap region with a blurring radius proportional to an expected magnitude of the shifting that is forgone.

In various implementations, the method 700 further includes the device, after generating the second image, determining the second predicted pose of the device for the second display time period. The method 700 includes generating a second display image by shifting, based on the second predicted pose of the device for the second display time period, the third region, excluding the overlap region, of the second rendered image. The method 700 includes displaying, on the display at the second display time period, the second display image.

In various implementations, the second image includes a plurality of channels, such as bit-planes, color fields, or color channels. In various implementations, the method 700 further includes the device, after generating the second image, determining a predicted pose of the device for a first channel display time period. The method 700 includes shifting the third region, excluding the overlap region, of a first channel of the second image based on the predicted pose of the device for the first channel display time period. The method 700 includes displaying, on the display at the first channel display time period, the first channel of the second image. The method 700 includes determining a predicted pose of the device for a second channel display time period. The method includes shifting the third region, excluding the overlap region, of a second channel of the second image based on the predicted pose of the device for the second channel display time period. The method 700 includes displaying, on the display at the second channel display time period, the second channel of the second image.

Although various embodiments described above include a late-stage shift in which world-locked content is shifted in an image based on an updated predicted pose of the device, in various implementations, the late-stage shift is replaced or supplements by other late-stage reprojection, such as a homographic transformation, a rotation, or a resizing.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a display, one or more processors, and non-transitory memory:
   generating, based on a first predicted pose of the device for a display time period, a first image;
   generating a mask indicating a first region of the first image and a second region of the first image;
   generating a second image by shifting, based on a second predicted pose of the device for the display time period, the first region of the first image without shifting the second region of the first image; and
   displaying, on the display at the display time period, the second image.

2. The method of claim 1, wherein generating the first image includes:
   generating a first rendered image based on a third predicted pose of the device for the display time period, the first rendered image including a first layer and a second layer; and
   generating the first image by transforming, based on the first predicted pose of the device for the display time period, the first layer and compositing the transformed first layer and the second layer.

3. The method of claim 2, wherein the first layer includes world-locked content and the second layer includes display-locked content.

4. The method of claim 2, wherein generating the first image includes blurring at least a portion of the first layer.

5. The method of claim 2, further comprising:
   generating a third image by transforming, based on a first predicted pose of the device for a second display time period, the first layer and compositing the transformed first layer and the second layer;
   generating a second mask indicating a first region of the third image and a second region of the third image;
   generating a fourth image by shifting, based on a second predicted pose of the device for the second display time period, the first region of the third image without shifting the second region of the third image; and
   displaying, on the display at the second display time period, the fourth image.

6. The method of claim 1, wherein the second region includes display-locked content.

7. The method of claim 1, wherein the second region includes world-locked content overlapped by display-locked content.

8. The method of claim 1, wherein the first region includes world-locked content not overlapped by display-locked content.

9. The method of claim 1, wherein the mask includes a matrix of elements corresponding to pixels of the first image, wherein the mask indicates the first region with elements having a first value and indicates the second region with elements having a second value different than the first value.

10. The method of claim 1, wherein the mask indicates the second region via a set of coordinates.

11. The method of claim 1, further comprising:
   determining the first predicted pose of the device for the display time period; and
   after determining the first predicted pose of the device for the display time period, determining the second predicted pose of the device for the display time period.

12. A device comprising:
   a display,
   a non-transitory memory; and
   one or more processors to:
      generate, based on a first predicted pose of the device for a display time period, a first image;
      generate a mask indicating a first region of the first image and a second region of the first image;
      generate a second image by shifting, based on a second predicted pose of the device for the display time period, the first region of the first image without shifting the second region of the first image; and
      display, on the display at the display time period, the second image.

13. The device of claim 12, wherein the one or more processors are to generate the first image by:
   generating a first rendered image based on a third predicted pose of the device for the display time period, the first rendered image including a first layer and a second layer; and
   generating the first image by transforming, based on the first predicted pose of the device for the display time period, the first layer and compositing the transformed first layer and the second layer.

14. The device of claim 13, wherein the first layer includes world-locked content and the second layer includes display-locked content.

15. The device of claim 13, wherein generating the first image includes blurring at least a portion of the first layer.

16. The device of claim 13, wherein the one or more processors are further to:
   generate a third image by transforming, based on a first predicted pose of the device for a second display time period, the first layer and compositing the transformed first layer and the second layer;
   generate a second mask indicating a first region of the third image and a second region of the third image;
   generate a fourth image by shifting, based on a second predicted pose of the device for the second display time period, the first region of the third image without shifting the second region of the third image; and
   display, on the display at the second display time period, the fourth image.

17. The device of claim 12, wherein the second region includes display-locked content.

18. The device of claim 12, wherein the second region includes world-locked content overlapped by display-locked content.

19. The device of claim 12, wherein the first region includes world-locked content not overlapped by display-locked content.

20. A non-transitory memory storing one or more programs, which, when executed by one or more processors of a device including a display, cause the device to:
   generate, based on a first predicted pose of the device for a display time period, a first image;
   generate a mask indicating a first region of the first image and a second region of the first image;
   generate a second image by shifting, based on a second predicted pose of the device for the display time period, the first region of the first image without shifting the second region of the first image; and
   display, on the display at the display time period, the second image.

* * * * *